Sept. 6, 1949.  J. J. SMITH  2,481,481

SEALING RING FOR PIPE COUPLINGS

Filed June 27, 1947

Inventor
JOHN J. SMITH

Cushman, Darby & Cushman
Attorneys

Patented Sept. 6, 1949

2,481,481

UNITED STATES PATENT OFFICE 2,481,481

SEALING RING FOR PIPE COUPLINGS

John J. Smith, Decatur, Ill., assignor to Mueller Co., Decatur, Ill., a corporation of Illinois Application June 27, 1947, Serial No. 757,398

1 Claim. (Cl. 285—55)

The present invention relates to a pipe connection, specifically an assembly for attaching a tubular fitting in the wall of a chamber to make a connection with said chamber for flow of fluid. The invention is particularly concerned with such a connection applied to pipes of relatively small diameter.

This invention is an improvement in the pipe connection and sealing member as disclosed in Patent 2,199,647, to Mueller et al., dated May 7, 1940. In that patent, a sealing member is disclosed comprising a hollow ring shaped carrier of thin deformable metal, and a ring of compressible packing material in said carrier. The packing ring disclosed in said patent has exposed inner and bottom walls to effect seals with the conduit and the fitting connected thereto when the sealing member is distorted by a threaded follower on the fitting, all as described in said patent.

The present invention has all of the features and advantages recited in said patent, and the disclosure of said patent is incorporated herein by reference.

In the practical use of sealing members as disclosed in said patent, it has been found in some instances that the member is not sufficiently distorted to properly seal a very small pipe or main. It has been found after considerable experiment, that a modified type of sealing member as disclosed herein, is of pronounced sealing effectiveness when used, for example, on the smaller pipe sizes, such as pipes of 2 inches inside diameter down to those of size 1¼ inches inside diameter.

A principal object of invention is to provide a sealing member of the class referred to, which is provided with a bottom surface pre-formed substantially to the curvature of the conduit, whereby a tight seal may be insured when the sealing member is deformed against the conduit, even though the conduit has a relatively steep outside curvature as in the case of conduits of the smaller sizes.

It is a purpose of the invention to provide a sealing member which is so formed on its under-surface, that the pressure applied by a follower will immediately react on those portions of the sealing member which are at the sides of the conduit, as distinguished from the portions thereof which are along the top of the conduit, when the connection is applied as disclosed in the drawings.

Various other objects and advantages of the invention will be apparent as the structure is specifically described.

As indicated above, the invention is useful for the same purposes as discussed in the said Patent 2,199,647, and may be used in association with pipes which are covered and lined, as mentioned in that patent, or with bare pipes.

Figure 1:
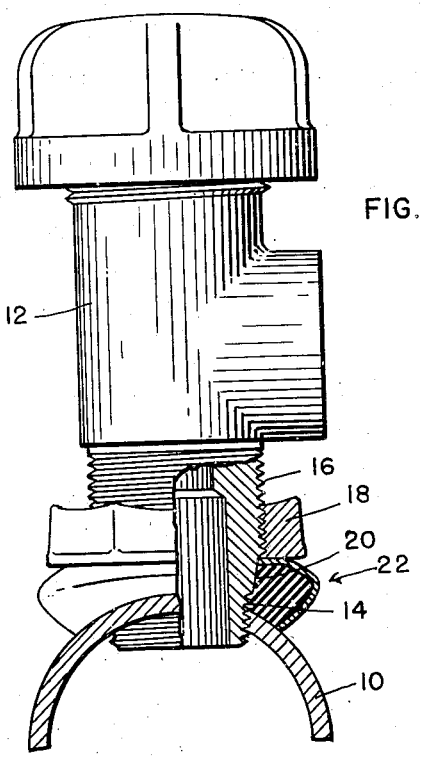
Figure 1 is a vertical sectional view taken laterally of a conduit with a fitting shown attached thereto, the fitting and sealing member being partly in section.

In Figure 1, the conduit is shown at 10. An opening of predetermined size is drilled at the desired point through the wall of the conduit, and this opening is then tapped to form pipe threads. The opening is shown in the drawings extending through the top wall of the conduit. It will be understood that this position of the opening is shown for illustrative purposes only, and such words as "upper" and "lower" and similar relative terms are used herein merely for descriptive convenience to define the relation of the parts as shown, and are not words of limitation.

A fitting 12 is threaded into the opening in the conduit 10. This fitting is illustrated as a service T of the type generally disclosed in the Henderson Patent 2,336,173 December 7, 1943. It will be understood that the invention is useful with any other type of fitting, including simple tubular T or L connections or valved connections. The fitting 12 has a lower tubular end threaded into the opening of the conduit, threads 14 for this purpose extending for any appropriate length, there being an enlarged upper tubular portion threaded as at 16 to carry the follower nut 18 which compresses the sealing member as hereinafter described. The upper and lower threads 14 and 16 may be separated by smooth section 20 on the lower end of the T, around which the sealing member 22 is positioned.

Figure 4:
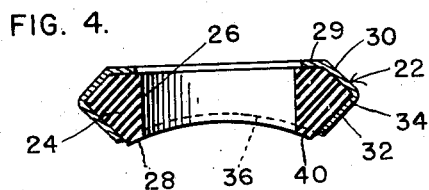
Figure 4 is a central vertical sectional view through the sealing member as it appears in Figure 3, taken along the line 4—4 of Figure 8.
Figure 6:
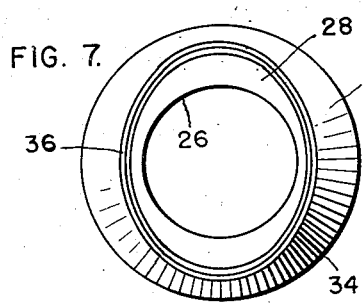
Figure 6 is a central vertical sectional view through the sealing member as shown in Figure 5, taken along the line 6—6 of Figure 8.

Referring particularly to Figure 4, the sealing member comprises a ring of compressible packing material 24, such as rubber or rubber composition, and a hollow ring shaped carrier of thin deformable metal for housing said packing ring. The carrier may be made of copper or other similar thin material of sufficient strength, which can be deformed to assume the shape of the conduit. The packing ring has a top flat face and a straight exposed cylindrical wall 26 as shown. The exposed bottom surface 28 of the packing ring is of cylindrical form, generally of the same radius, or very close thereto, as the curvature of the outside of the range of small pipe sizes on which the sealing member is intended to be used. It may be said that the sealing ring 24 has outer walls which are covered by the carrier and which do not contact the fitting or conduit, and inner walls which are exposed and which do contact the fitting and conduit.

The shape of the carrier is generally conformed to the top and outer surfaces of the packing ring. While the outside wall of the carrier may be of curved or elliptical form, in vertical cross section, the most effective results are achieved when the outside wall comprises upper and lower conical flat areas 30 and 32 which meet at a joint 34 extending throughout the perimeter of the sealing member.

Figure 3:
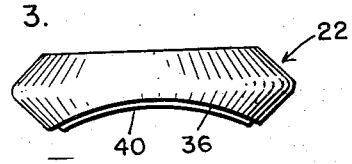
Figure 3 is a side elevational view of the sealing member of the invention, looking inwardly toward the arcuate cut-out bottom surface thereof.
Figure 5:
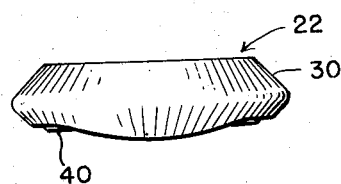
Figure 5 is a side elevational view of the sealing member as it appears when viewed from a point at right angles from the view of Figure 3, i. e., looking inwardly toward the sealing member of Figure 3 from the right.

The lower edge of the carrier is cut in the cylindrical or saddle shape as previously referred to along the line 36. This surface of the carrier is so cut, with respect to the corresponding lower cylindrical surface 28 of the packing ring, that a lip of packing 40 may be provided all the way around the central opening through the sealing member. For example, this protruding lip 40 appears when the sealing member is viewed as in Figure 3.

Figure 2:
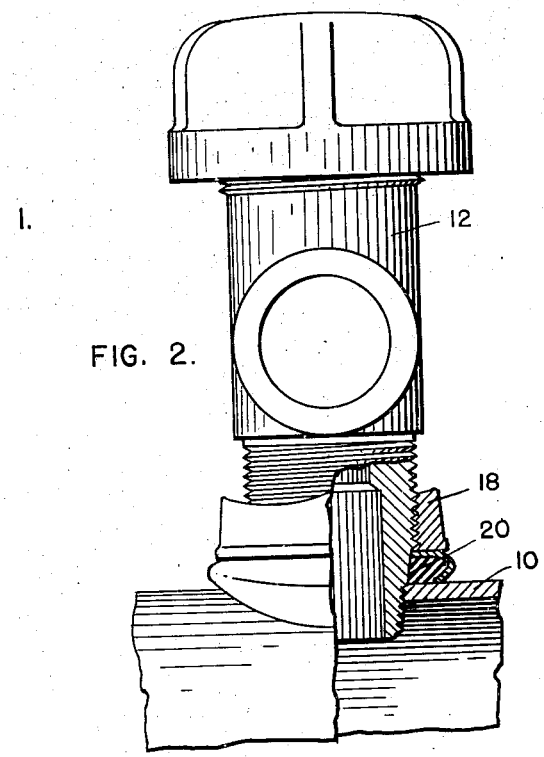
Figure 2 is a similar view taken longitudinally of the conduit.

The fitting and sealing member are applied to the conduit in the same mannr as described in detail in Patent 2,199,647, it being understood that the member will be in the un-distorted condition shown in Figures 3 through 8, when it is applied to the conduit. When the follower 18 is set up or tightened, the sealing member is distorted as shown in Figures 1 and 2, to a lesser extent in a plane laterally of the conduit (Figure 1) and to a more pronounced extent in a plane longitudinally of the conduit (Figure 2).

It will be understood that because of the cylindrical curvature of the bottom face of the sealing member, uniform compression of this member throughout its entire area will be almost immediate when the follower 18 is tightened. Hence, more uniform pressure is transmitted against the wall of the conduit and against the fitting at points all around the sealing member. Furthermore, such a sealing member as disclosed does not require the degree of distortion in the longitudinal plane (Figure 2), as in the case of the construction of Patent 2,199,647, in order to exert pressure sufficiently great in the lateral plane (Figure 1) to insure the necessary seal.

With the sealing member of this invention, it is possible to complete an effective seal on a pipe approximately ¼ inch larger or smaller in diameter than the conduit diameter for which the particular sealing member is designed. For example, a 2-inch sealing member will be found satisfactory in use, for both pipe sizes 2¼ inches and 1¾ inches. The contour of the sealing member, in practice, will be based on the outside diameter of the particular pipe size.

Figures 7, 8:
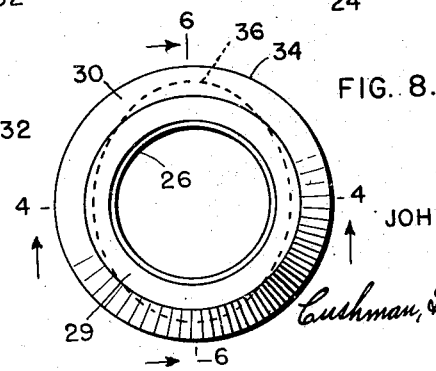
Figure 7 is a bottom plan view of the sealing member.
Figure 8 is a top plan view of the sealing member.

As is apparent from Figures 4 and 7, the bottom edge of the carrier is cut-out in a concave manner in the form of an ellipse 36. This cut-out will relieve the bottom face of the sealing member in a cylindrical manner, whereby to reduce the amount of distortion required at points along the top or upper surface of the main to obtain the necessary sealing distortion and pressure at points along the side of the main adjacent the union. As viewed in Figure 3, the lower edge of the carrier is relieved at sides of the sealing member which lie toward the longitudinal direction of the conduit, whereby pressure applied by the follower 18 with its flat force applying face is more immediately effective to distort the carrier on the sides thereof which lie laterally of the conduit.

While I have shown the packing ring 24 similarly relieved along its lower face, it is the relieving of the edge of the carrier that is more vital. However, in producing the sealing members of the present invention, it may be found to be more convenient to form said members as in Figure 5 of Patent 2,199,647, and thereafter simply cut out the saddle surface from both the edge of the carrier and the bottom face of the packing or sealing ring.

It will be apparent that I have provided a sealing member which will be found to be useful when applied to conduits of all sizes. However, as stated, the invention is of particular use when the sealing member is designed for, and applied to, conduits of the smaller sizes.

As stated, the sealing member is formed with a lower concave surface of a degree of curvature corresponding with that of the conduit on which the sealing member is intended to be used. By corresponding curvature, I intend to include not only the exact curvature of the conduit, but also curvatures which may differ from the radius of the conduit within reasonable limits of usefulness.

I claim:

A sealing member for application to the union of a fitting and a conduit and adapted to be compressed and distorted against the outer wall of the conduit by a follower threaded on the fitting, comprising a hollow ring-shaped carrier of thin deformable metal, and a ring of compressible packing material mounted in and filling the interior of said carrier, said packing ring having an exposed inner wall to surround the fitting and an exposed bottom wall formed to the curvature of the conduit, said carrier having a flat top wall and an outside wall confining the outer wall of said packing ring, the outside wall of said carrier being arched in form and having a circular bend therein located between the top and bottom walls of said packing ring, said carrier having a lower edge which is cut away at diametrically opposite sides of said member before application of said member to the union to form said edge to the cylindrical curvature of the conduit on which said member is used, said packing ring having a relatively narrow continuous lip which carries the curved bottom wall of said packing ring and which protrudes beyond said edge before said member is deformed; said lip being arranged to be pressed to a position within said edge when said member is compressed by the follower.

JOHN J. SMITH.

REFERENCES CITED

The following references are of record in the file of this patent:

UNITED STATES PATENTS

| Number | Name | Date |
| --- | --- | --- |
| 1,616,390 | Powell | Feb. 1, 1927 |
| 2,199,647 | Mueller | May 7, 1940 |
| 2,265,703 | Simpson | Dec. 9, 1941 |